Jan. 12, 1954  V. H. HASSELQUIST  2,665,737
APPARATUS FOR SEAMING PLASTIC SHEET MATERIAL
Filed Aug. 26, 1949  3 Sheets-Sheet 3
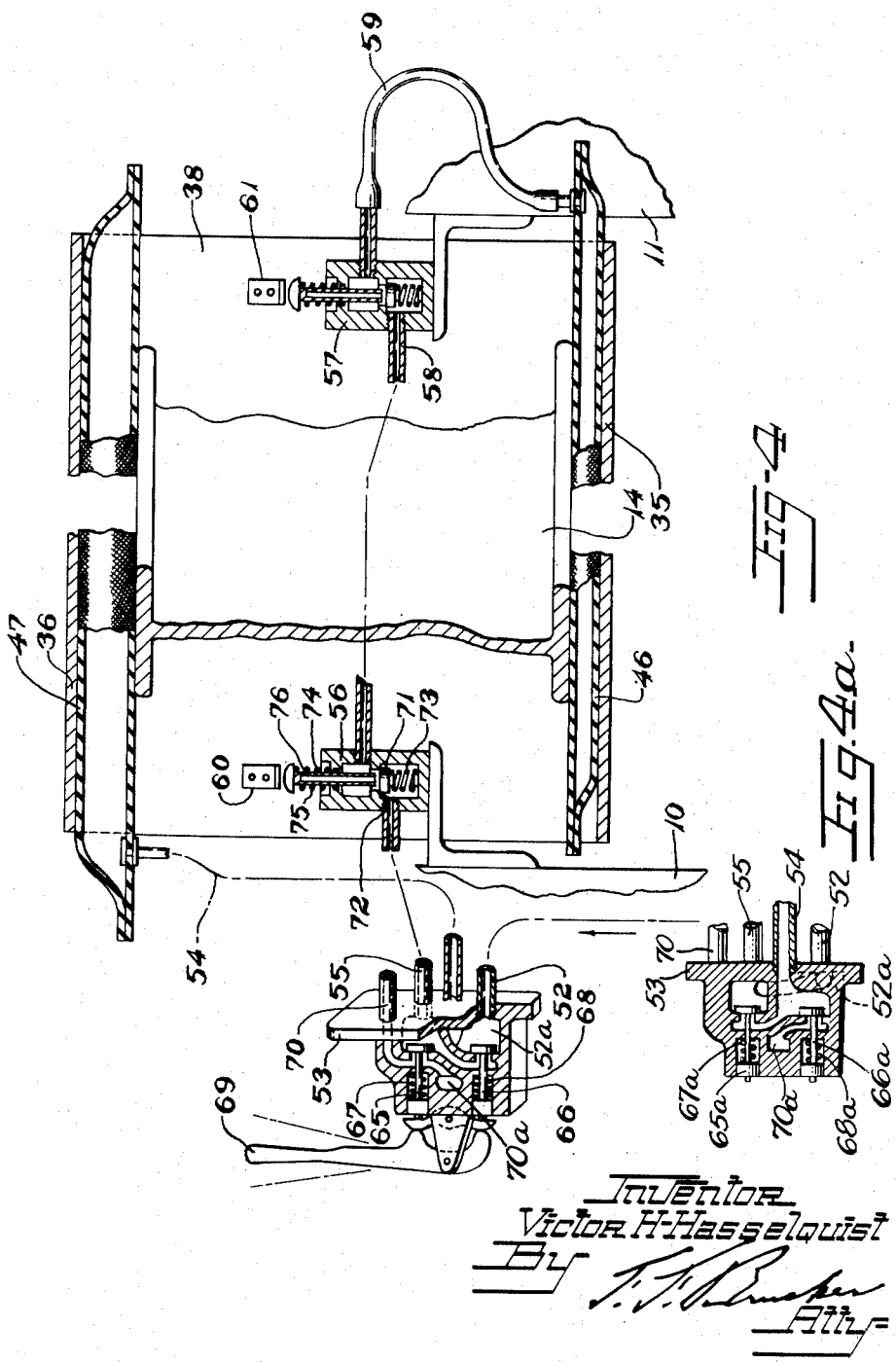
Inventor
Victor H. Hasselquist
By
Att'y Patented Jan. 12, 1954

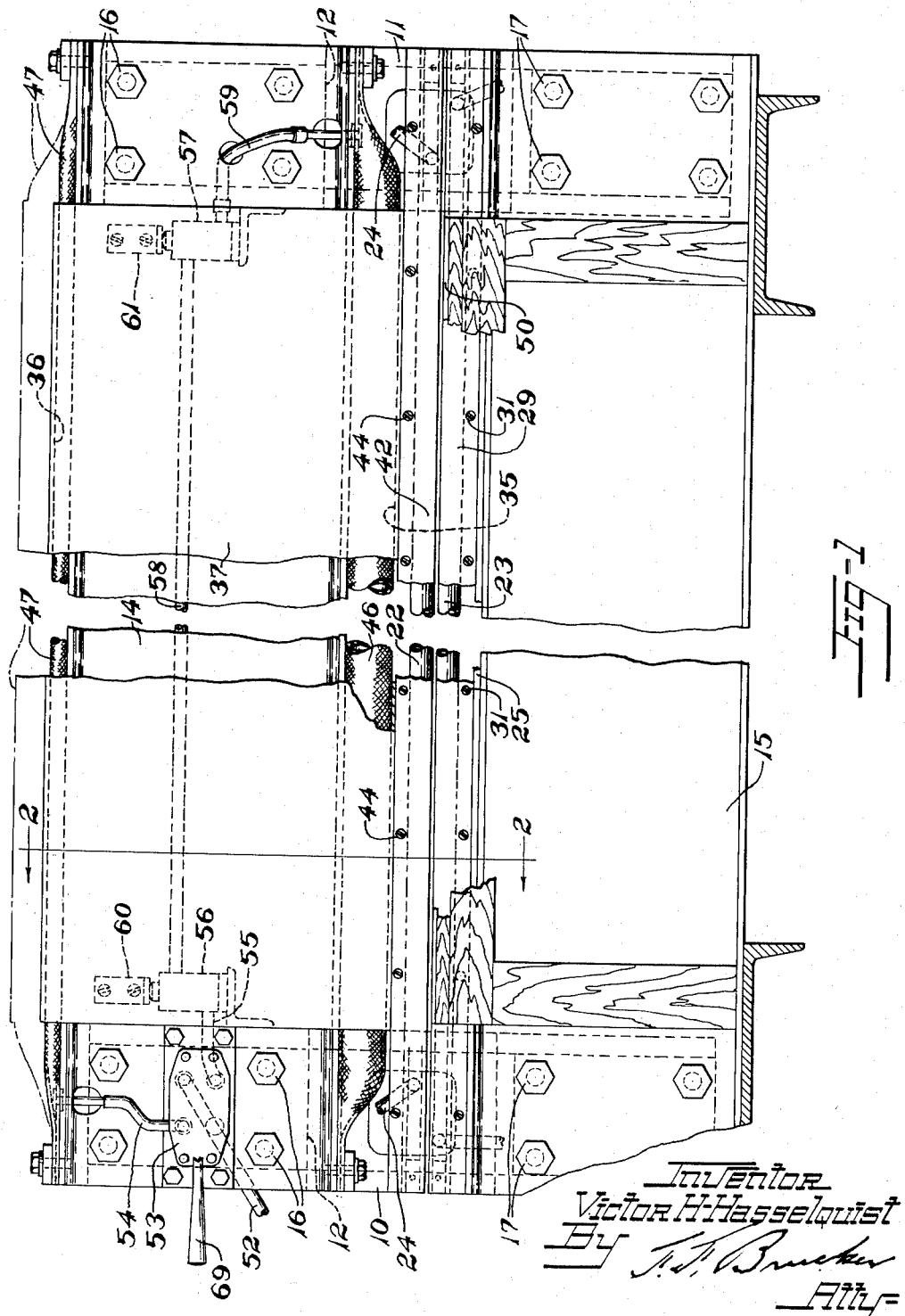

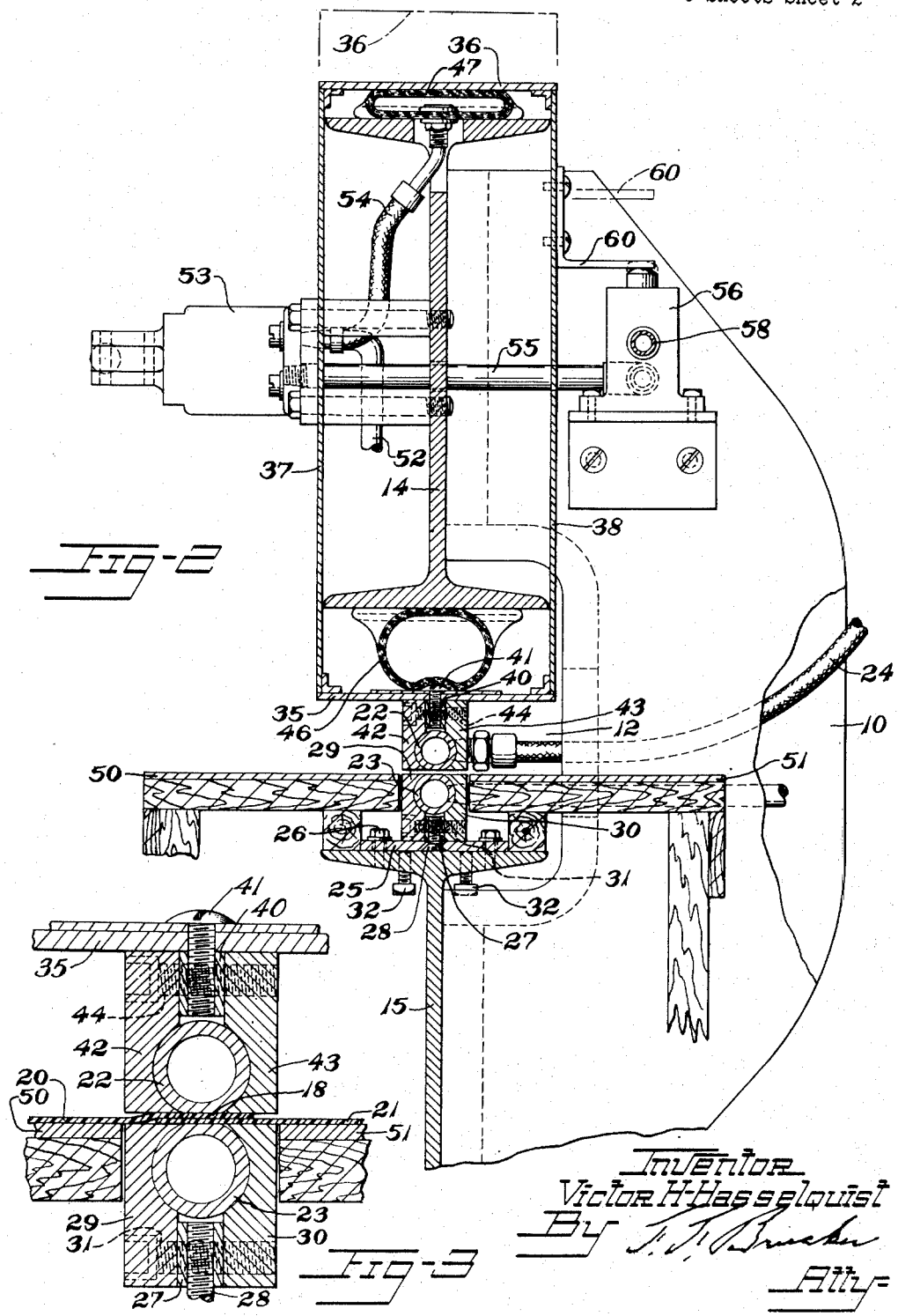

2,665,737

UNITED STATES PATENT OFFICE 2,665,737

APPARATUS FOR SEAMING PLASTIC SHEET MATERIAL

Victor H. Hasselquist, Akron, Ohio, assignor to The B. F. Goodrich Company, New York, N. Y., a corporation of New York Application August 26, 1949, Serial No. 112,585

5 Claims. (Cl. 154—42)

This invention relates to apparatus for heat seaming plastic sheet material and is especially useful in applying heat and pressure simultaneously entirely along a seam of great length.

Heretofore great difficulty has been encountered in the seaming of plastic sheets of material of great extent in that when it was attempted to form the seam progressively it has been impossible to keep the seam straight and to maintain the sheets under uniform tension as they were joined, resulting in puckering or bagging of the material adjacent the seam, and spoiling the appearance of the article. Difficulties arose in attempting to seam the sheets simultaneously at all positions along the desired line of attachment as a great amount of pressure was required to be applied and uniformly distributed along the seam, involving very strong and expensive machinery, and difficulties were also presented in providing adequate strength while at the same time not interfering with the material to be seamed.

It is an object of the present invention to provide for the simultaneous seaming of extensive sheets, to provide efficient and powerful apparatus at minimum cost, to provide for clearing the sheet material, to provide uniform pressure along the seam and to provide safety of operation.

These and other objects will appear from the following description and the accompanying drawings.

Of the drawings,

Fig. 1 is a side elevation of apparatus constructed in accordance with and embodying the invention, portions being broken away and portions shown in section.

Fig. 2 is a sectional view thereof taken on line 2—2 of Fig. 1, showing in full lines the lowered position of the box-like movable support, and in dot and dash lines indicating its raised position.

Fig. 3 is a sectional view of the heating and pressing elements to a larger scale.

Fig. 4 is a diagrammatic view partly in section and partly broken away showing the valves and their connections.

Fig. 4a shows the remainder of the control valve unit.

Referring to the drawings, the numerals 10 and 11 indicate a pair of C-shaped frame members each having a gap 12. Secured to the frame members and extending between them are upper and lower frame members such as the I-beams 14, 15 respectively. The beam 14 is mounted directly above and spaced apart from the beam 15 with the lower flange of beam 14 and the upper flange of beam 15 extending through the gap 12, the central webs of the beams being secured to the frame members 10, 11 by bolts 16, 17, the C-shaped members and the I-beams constituting a stationary frame structure.

Heating and pressing of the seam 18 between sheets 20, 21 (see Fig. 3) is accomplished by superimposed dies or pressing members in the form of tubes 22, 23 of heat conductive metal, the ends of which are connected by flexible hose 24 to a suitable steam supply (not shown). The work-contacting faces of the tubes may be flattened, as shown, if desired.

For supporting the lower tube 23 while permitting expansion and insulation thereof from the frame, a plate of heat insulating material 25 is secured along the upper face of the beam 15, as by screws 26. A number of spacer blocks 27, of metal are secured at spaced intervals to plate 25 as by screws 28. Clamp bars 29, 30, having half round grooves in their opposed faces for accommodating the pipe 23, are secured to each other through openings in the spacer blocks by screws 31. The arrangement is such that the upper surface of the pipe 23 is exposed for heating and pressing purposes entirely therealong and the pipe may expand endwise when heated while the plate 25 insulates the pipe and its holding clamps against wasteful loss of heat. Set screws 32 may be employed to adjust the level of the pipe.

For supporting the upper pressing tube 22 a pair of plates 35, 36 are arranged below and above the beam 14 in spaced apart relation thereto and are held in spaced relation to each other by vertical plates 37, 38 secured at their margins to plates 35, 36 and clearing the beam 14 and frame members 10, 11. The arrangement is such that the beam 14 is enclosed on four sides between frame members 10, 11 by a moveable support in the form of a box-like structure of which the plates 35, 36 are the bottom and top respectively and plates 37, 38 are the sides. A number of spacer blocks 40 are secured along the center of plate 35 and are secured thereto, as by screws 41. Clamps bars 42, 43 having half round grooves in their opposed faces for engaging the pipe 22 are secured to each other through cross openings in the spacer blocks 40 by screws 44.

For moving the tube 22 toward and from the pipe 23, an inflatable container in the form of a tube 46 of rubber or other pliable material, such as a length of fire hose, is mounted between the lower flange of beam 14 and the plate 35 and a similar inflatable container such as tube 47 is mounted between the upper flange of beam 14 and the plate 36. The arrangement is such that when tube 46 is inflated and tube 47 deflated, as seen in Fig. 2, tube 22 is lowered, and when tube 46 is deflated and tube 47 is inflated, as seen in Fig. 4, tube 22 will be raised. Also, when tubes 46 and 47 are both deflated the tube 22 and its support will be lowered by the force of gravitation. Tables 50, 51 may be provided on each side of the tube 23 and level with the top thereof to support the material to be seamed.

For controlling movement of the tube 22, air or other fluid under pressure may be supplied from a convenient source (not shown) by a pipe 52 to a three-way valve 53 which supplies fluid selectively to a flexible conduit 54 and a pipe 55. Pipe 55 is connected to a plunger operated valve 56 normally open to exhaust and closed against pressure and mounted on frame member 10. A similar valve 57 is mounted on frame member 11 and is connected to valve 56 by a pipe 58. Valve 57 supplies fluid to tube 46 through a flexible conduit 59. A pair of stops 60, 61 are mounted on plate 38 at such elevations that with the pressing tubes 22, 23 slightly separated, valves 56, 57 will be closed against flow of pressure fluid to tube 46 and will at the same time permit fluid to exhaust therefrom. As seen in Figure 4 which shows valve 53 in neutral position and tube 47 inflated, valve 53 has four poppet valves, two of which 65, 66 are shown in Fig. 4, and two more, 65a and 66a in Fig. 4a. The valves are held against their seats by springs 67, 68, 67a and 68a and are opened by a lever 69. In the position shown, all four valves are closed. When lever 69 is moved to the left, valve 66 will open delivering fluid under pressure from pipe 52 and pressure chamber 52a to pipe 55 and at the same time pipe 54 will be connected to exhaust chamber 70a and pipe 70 by the opening of valve 66a. When lever 69 is moved to the right, fluid under pressure from pipe 52 will be connected to pipe 54 by the opening of valve 65a and pipe 55 will be connected to exhaust chamber 70a and hence to exhaust line 70 by the opening of valve 65.

Valve 56 has a single disc 71 held normally against its seat 72 by a spring 73 and pressure from line 55. It may be depressed by a tubular plunger 74 normally spaced from disc 71 by a spring 75. The plunger has an exhaust side opening 76 so that with plunger 74 elevated fluid from pipe 58 may escape between the lower end of plunger 74 and disc 71 through the plunger and side opening 76.

Valve 57 is identical to valve 56 and the arrangement is such that in the position shown tube 46 is exhausting through valves 56, 57 and will continue to do so even though lever 69 is moved to the left or right unless stops 60, 61 are lowered a sufficient distance to engage the tubular plungers of valves 56, 57 with their valve discs. By moving lever 69 to the left, tube 47 will be exhausted by way of pipe 54 through valve 53 to exhaust line 70. Now if nothing interferes with lowering of the upper pressing member, stops 60, 61 will depress the plungers of valves 56, 57 which upon contact with the valve discs will stop exhaust from tube 46 and upon dislodging disc 71 fluid under pressure will pass from pipe 55 through valves 56, 57 to tube 59 and tube 46 will be inflated, pressing the die members together. However, should something, such as the fingers of an operator, interfere with tube 22 being lowered to a position where stops 60, 61 do not open valves 56, 57, tube 46 will not be inflated until the interfering object is removed and only the weight of the tube 22 and its support will press the tube 22 downwardly.

In the operation of the press, the upper pressing member is raised. Two sheets of heat sealable material are arranged upon tables 50, 51 with their margins overlapped along the proposed seam and over the lower pressing member. Steam is admitted to the pressing members to heat them. The upper member is then lowered and pressure applied to the seam.

The apparatus has the advantage that although the pressing members are somewhat flexible, the pressure of the inflated tubes is uniformly distributed and seaming pressure is uniform. The apparatus depends for rigidity upon the I-beams and the construction is relatively cheap and at the same time highly efficient. The pressing members are so supported that they may expand and contract lengthwise quite freely.

The press is quite safe as pressure cannot be supplied when an operator is arranging a seam or otherwise has fingers between the pressing members as the fingers of the operator will prevent lowering of stops 60, 61 far enough to open valves 56, 57.

If desired the tubular pressing members may be heated electrically although steam is convenient for the purpose.

Variations may be made without departing from the scope of the invention as it is defined by the following claims.

I claim:

1. A press comprising a die-supporting frame member, a reaction-resisting frame member comprising an elongate beam, said frame members being supported one from the other in fixed spaced-apart relation one to another, a movable die-supporting member mounted for movement toward and from said die-supporting frame member and having an elongate passage surrounding said beam and defined by spaced-apart walls extending along opposite faces of said beam and spaced therefrom in the direction of movement of said movable member, one of said walls extending along a space between said frame members, an elongate inflatable container extending along and between said extending wall of said movable member and said beam, a second inflatable container extending along and between the opposite wall of the movable member and said beam, means for inflating and deflating said second inflatable container alternately for moving said movable die-supporting member toward and from said die-supporting frame member, and means for inflating said first container when the movable member is in a predetermined position relative to the beam to urge the movable member toward the die-supporting frame member.

2. A press comprising a die-supporting frame member, a reaction-resisting frame member comprising an elongate beam, said frame members being supported one from the other in fixed spaced-apart relation one to another, a movable die-supporting member mounted for movement toward and from said die-supporting frame member and having an elongate passage surrounding said beam and defined by spaced-apart walls extending along opposite faces of said beam and spaced therefrom in the direction of movement of said movable member, one of said walls extending along a space between said frame members, an elongate inflatable container extending along and between said extending wall of said movable member and said beam, a second inflatable container extending along and between the opposite wall of the movable member and said beam, an elongate seaming die on said die-supporting frame member, an elongate cooperating seaming die on said movable die-supporting member, and means for inflating the first said container when the movable member is at a predetermined position relative to the beam to urge the movable member toward the die-supporting frame member and to press the seaming dies together, the first said inflatable container being coextensive in length with said seaming dies and providing uniform seaming pressure therealong irrespective of deflection of said die members.

3. A seaming press comprising a pair of spaced, parallel, elongated rigidly-supported frame members, a seaming die fastened to the first of said frame members, a movable member engaged with the second of said frame members for movement relative thereto toward and away from said first frame member, the movable member having a portion extending between and parallel to said frame members, a seaming die fastened to said portion of the movable member to engage the aforesaid seaming die, an inflatable container between said portion and said second frame member, which container is substantially coextensive in length with said die supported on the movable member and is located in the plane defined by said pair of die members, means for moving the movable member toward the first frame member, and means for inflating the container when the movable member is at a predetermined position close to said first frame member to press the die supported by the movable member against the other die with pressure uniformly distributed along the complete length of the dies.

4. A seaming press comprising first and second, generally parallel, elongated rigidly-supported frame members, a first seaming die fastened to said first frame member, an elongated movable member mounted on said second frame member for free floating movement relative thereto toward and away from said first frame member, the movable member having a wall portion extending between said frame members, a second seaming die fastened to said wall portion of the movable member and arranged to clamp material against said first seaming die, an elongated inflatable tube-like container between said wall portion of the movable member and said second frame member, which container is substantially coextensive in length with said second seaming die, a valve mechanism for regulating the flow of an inflating medium to said container, and means on said movable member to engage said valve mechanism at a predetermined position of the movable member relative to said second member to inflate said container and urge said second die into clamping engagement against material on said second die with the pressure force uniformly distributed along the complete length of the dies.

5. A seaming press comprising first and second spaced, generally parallel, elongated rigidly-supported frame members, a first seaming die fastened to said first frame member, an elongated movable member mounted on said second frame member for free floating movement relative thereto toward and away from said first frame member, the movable member having a wall portion extending between said frame members, a second seaming die fastened to said wall portion of the movable member and arranged to clamp material against said first seaming die, an elongated inflatable tube-like container between said wall portion of the movable member and said second frame member, which container is substantially coextensive in length with said second seaming die, means for inflating said tubular container to urge said movable member toward said first frame member to resiliently press material disposed between said seaming dies with the pressure force uniformly distributed along the complete length of the dies, said movable member having another wall portion spaced from said second frame member when said dies are in clamped relation, another elongated inflatable tube-like container disposed between said other wall portion and said second frame member, and means for inflating the latter said container to retract the movable member upon deflation of the former said tube-like container.

VICTOR H. HASSELQUIST.

References Cited in the file of this patent

UNITED STATES PATENTS

| Number | Name | Date |
|---|---|---|
| 2,084,113 | Sherts | June 15, 1937 |
| 2,208,539 | Brown | June 16, 1940 |
| 2,379,220 | Englehart | June 26, 1945 |
| 2,382,958 | Burgoine | Aug. 21, 1945 |
| 2,411,043 | Klassen | Nov. 12, 1946 |
| 2,509,439 | Langer | May 30, 1950 |